Nov. 25, 1969
L. B. VENABLE
3,480,342
SHAFT JOURNALS
Filed Sept. 22, 1967
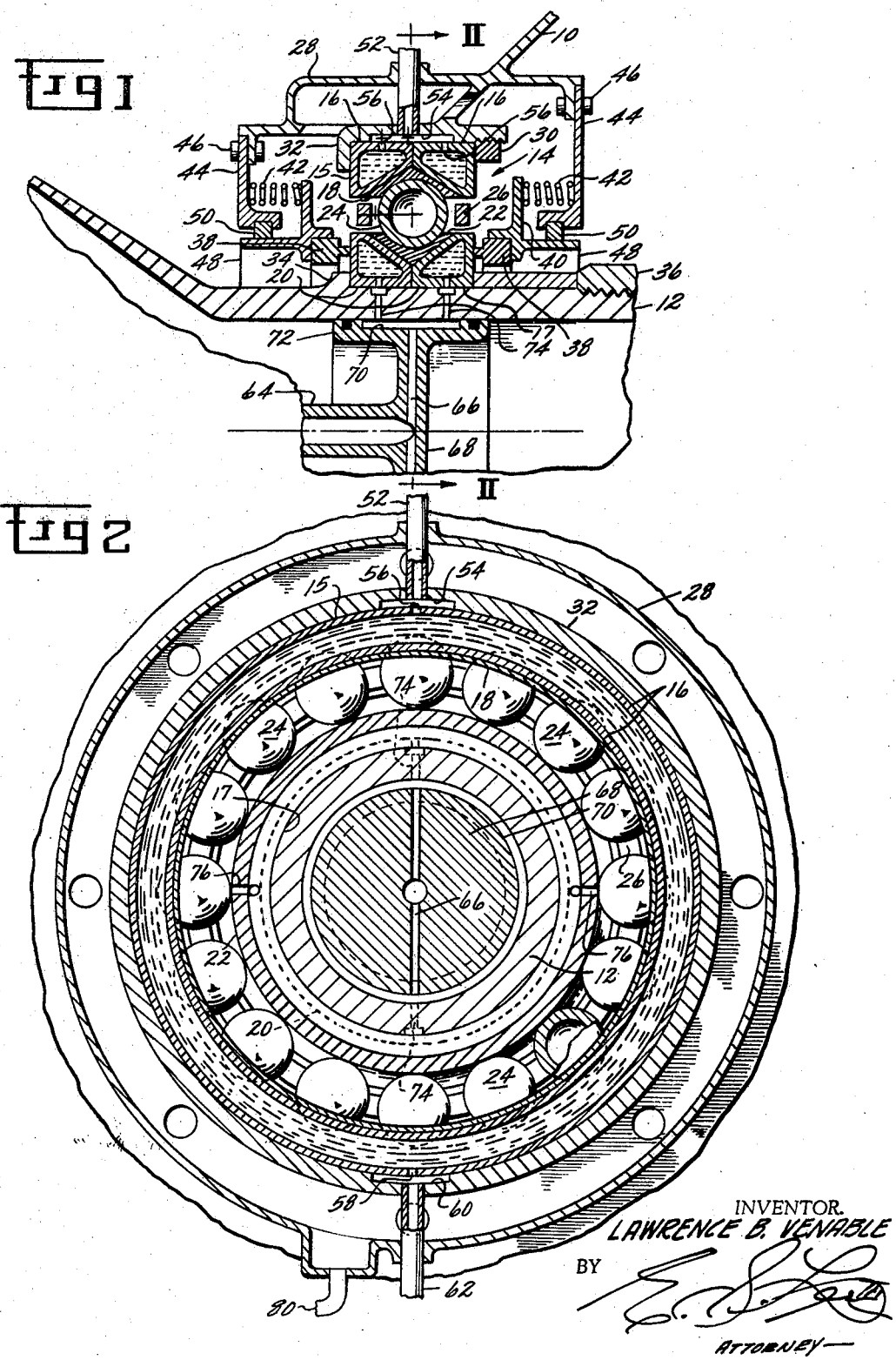
INVENTOR.
LAWRENCE B. VENABLE
BY
ATTORNEY United States Patent Office 3,480,342
Patented Nov. 25, 1969

3,480,342
SHAFT JOURNALS
Lawrence B. Venable, Cincinnati, Ohio, assignor to General Electric Company, a corporation of New York
Filed Sept. 22, 1967, Ser. No. 669,770
Int. Cl. F16c 1/24, 3/14, 3/16
U.S. Cl. 308—187                               8 Claims

ABSTRACT OF THE DISCLOSURE

A roller bearing having compositely formed inner and outer races through which coolant fluid is circulated to maintain a minimum temperature level. Coolant for the inner race is circulated to the bearing rollers to provide lubrication therefor. The bearing is disposed in a stationary sump, into which the lubricant is discharged and from which it is drained to prevent any positive fluid pressure from being built up therein. The rotating shaft and stationary sump, are sealed by seals which engage the cooled, inner bearing race.

---

The present invention relates to improvements in shaft journals and, more particularly, to an improved bearing construction and sealing arrangement therefor.

Conventional journaling arrangements for high speed shafts, such as are found in gas turbine engines, first, a bearing and, then, a surrounding sump in order to contain the lubricant provided for the bearing. This, of course, necessitates the provision of seals between the relatively rotatable portions of the journal and the stationary sump. Such arrangements in the past have been quite complicated and expensive. This can be attributed to the fact that not only is lubricant provided for the purpose of lubrication, but also it is employed to provide cooling of the bearing, due to the extreme amounts of heat which are generated under high loads and high rates of operation. The large amount of lubricant has several disadvantages, not only in the complicated seal arrangements which are required, but also in the loss of efficiency resulting from viscous drag caused by the excessive amount of lubrication employed. Further, the high lubricant flow rates required for cooling purposes put an additional burden on the scavenging pumps which must be employed to evacuate the sumps an dprevent the build-up of any positive fluid pressure therein. Yet another drawback of conventional journals is the weight of the bearings employed therein.

The object of the invention is to overcome or at least substantially reduce the above problems associated with the journaling of shafts.

To this end, one aspect of the invention is found in the provision of hollow inner and outer races with means for circulation of coolant therethrough.

Further, and in accordance with another aspect of the invention, a bearing having an inner hollow race is employed to mount a shaft on a frame having a sump surrounding the bearing. Coolant is circulated through the inner race to maintain it at a sufficiently low temperature for engagement seals, such as the carbon type, to provide an effective seal between the rotating and non-rotating parts of the journal. The coolant is preferably a lubricant which is directed to roller elements of the bearing and then drained or scavenged from the sump.

Another feature of the invention is found in compositely formed bearing races fabricated by relatively light, hollow shells having hardened metal inserts on which the roller elements of the bearing ride.

The above and other related objects and features of the invention will be apparent from a reading of the description found in the accompanying drawing and the novelty thereof pointed out in the appended claims.

In the drawing:

FIGURE 1 is a longitudinal half section of a shaft and journal therefor, formed in accordance with the present invention; and FIGURE 2 is a section take on line II—II in FIGURE 1.

In FIGURE 1, reference character 10 designates a stationary frame member of the type normally found in a gas turbine engine, and reference character 12 a hollow shaft, having a conical end portion, also typical of gas turbine engine construction. The shaft 12 is journaled for rotation relative to the frame 10 by means including a compositely formed bearing 14, which will now be described in detail.

The outer race 15 of the bearing 14 comprises a pair of hollow cylindrical shells 16 of generally triangular, longitudinal half section and a raceway 18. The inner race 17 is similarly formed by a pair of hollow, cylindrical shells 20 and a raceway 22. The races 15, 17 may be fabricated by brazing, diffusion bonding or other techniques so that they are structurally integral.

The antifriction elements of the bearing 14 comprise a plurality of hollow balls 24 which ride on the raceways 18 and 22 and are spaced apart in the usual fashion by a cage 26. The bearing 14 is disposed within a sump or casing 28 which is illustrated as a part of the frame member 10.

The bearing 14 is secured to the frame 10 by a nut 30 which clamps the outer race 15 against a frame flange 32 internally of the sump 28. The inner race of the bearing 14 is clamped against a shoulder 34 on the shaft 12 by a nut 36.

The sump 28 contains lubricating fluid provided for the bearing 14. To effectively seal the sump chamber at its juncture with the rotating portions of the journal, face carbon seals 38 engage the opposite radial faces of the inner race 17. The seals 38 are mounted in holders 40 which are urged by springs 42 toward the bearing 14, thereby providing a firm seating of the carbon seals 38 against the opposite sides of the inner race of the bearing. The springs 42 bear against end caps 44, secured by screws 46 to further define opposite sides of the sump 28. The bearing holders 40 further comprise cylindrical portions 48 which are sealed relative to the end caps 44 by gasket members 50 or carbon seal, as appropriate, thereby preventing any leakage of oil between the bearing holder and the end caps as a result of axial movement of the seal holders relative to the end caps 44, in maintaining a firm sealing engagement with the inner race of the bearing 14.

A tube 52 extends through the outer wall of sump 28 to a recess 54 in the portion of the frame receiving the outer race of the bearing 14. Coolant fluid passes through the tube 52 and the recess 54 to holes 56 in the cylindrical shells 16. This coolant fluid may then flow through the passageways provided by these hollow shells to exit holes 58 at opposite or lower sides of the two shells (FIGURE 2). The coolant is then discharged into a recess 60 at the opposite side of the frame receiving the race of the bearing 14 and to a tube 62 which conveys the coolant fluid back to a source where the heat may be extracted therefrom or the coolant fluid could conceivably be discharged overboard. In any event there is provided means for continually circulating coolant through the outer race of the bearing.

Similarly, there is a continuous flow of coolant through the inner race of the bearing as the coolant, preferably in the form of a lubricant such as an appropriate oil, passes through a hollow shaft 64 disposed internally and fixed relative to the rotating shaft 12. The coolant may then flow through a passageway 66, radially in a flange 68, to an annular groove 70, formed in a piston-like element 72 which is sealed against the rotating shaft 12. The lubricant coolant passes through holes 74, formed in the shaft 12, and continuations of these holes into the hollow shells 20 of the inner race 17. The coolant lubricant then passes through one or more passageways 76 (see FIGURE 2) leading to the bearing surface of raceway 22. The passageways 76 are angularly offset from holes 74 so that there will be continuous circulation of the coolant through the inner race before it is utilized to provide lubrication for the rollers 24 and the race elements 18 and 22. The coolant is then collected in the sump 28 and may be drained therefrom through a tube 80 in the usual fashion of scavenging lubricant oil from a bearing sump of this type.

With the described arrangement not only is there a cooling of the bearing itself by the continuous circulation of coolant through the interiors of the compositely formed inner and outer races, but, further, a controlled amount of oil employed for lubrication is minimized and thus viscous drag can be significantly reduced. Another advantage of the described arrangement is that by maintaining the inner race at a relatively low temperature, the carbon seals 38 may be effective thereagainst to provide an extremely simple and reliable sump sealing arrangement with extremely high rates of rotation. With the described construction the race shells 16, 20 are preferably formed of a relatively light material having a relatively high conductivity, such as titanium. This not only minimizes bearing weight but also reduces the heat built up in the bearing and at the seals 38. The preferred use of the hollow balls 24 increases the load carrying capacity of such compositely formed hollow races.

Having thus described the invention, what is claimed as novel and desired to be secured by Letters Patent of the United States is:

1. A journal for mounting a shaft relative to a frame, said journal comprising:
   a bearing having inner and outer races and antifriction elements rollingly engaging opposed raceway surfaces of the races,
   means for clamping said inner race to the shaft,
   means for mounting the outer race on the frame,
   a sump connected to said frame and surrounding said bearing,
   said inner bearing race being hollow,
   means for circulating coolant through said inner race,
   means, engageable with said cooled inner race, for sealing the sump cavity at its juncture with the rotating portions of the journal.

2. A journal as in claim 1 wherein the sealing means comprise:
   a pair of face seals engageable with radial faces on opposite sides of said cooled inner race, and
   means for yieldingly urging said seals into sealing engagement with said inner race.

3. A journal as in claim 1 wherein,
   the coolant is a lubricant, and
   further comprising,
   passageways from said hollow inner race to the raceway surface thereof to lubricate said antifriction elements, and
   means for draining said coolant lubricant from said sump.

4. A journal as in claim 3 wherein,
   the sealing means comprise:
   a pair of circumferential seals engageable with radial faces on opposite sides of said cooled inner race, and
   means for yieldingly urging said seals into sealing engagement with said inner race, and
   further wherein,
   the outer race is hollow, and
   means are provided for continuously circulating coolant through said outer race.

5. A journal as in claim 4 wherein,
   the inner and outer races are each formed compositely by lightweight metal shells having hardened metal inserts secured on their outer and inner surfaces respectively to form said raceways.

6. A journal as in claim 5 wherein,
   the antifriction elements are hollow balls.

7. A journal for mounting a shaft relative to a frame, said journal comprising:
   (a) a bearing having inner and outer hollow races and antifriction elements rollingly engaging opposed raceway surfaces of the races;
   (b) said inner and outer races being formed compositely by lightweight metal shells having hardened metal inserts secured on their outer and inner surfaces respectively to form said raceways; and
   (c) means for continuously circulating coolant through said races to minimize the temperature rise of said bearing.

8. A journal as recited in claim 7 wherein said antifriction elements comprise hollow balls.

References Cited

UNITED STATES PATENTS

| | | | |
|---|---|---|---|
| 2,280,659 | 4/1942 | Muller | 308—187 |
| 2,977,162 | 3/1961 | Brooks | 308—187 |
| 3,090,656 | 5/1963 | Lewis et al. | 308—187 |
| 3,276,827 | 10/1966 | Diver et al. | 308—187 |
| 3,404,925 | 10/1968 | Bailey | 308—184 |

MARTIN P. SCHWADRON, Primary Examiner

FRANK SUSKO, Assistant Examiner